(No Model.)  
2 Sheets—Sheet 1.

W. J. STEVENS.
Horse Power.

No. 230,587. Patented July 27, 1880.

Attest:  
R. F. Barnes  
J. W. Seely

Inventor:  
William J. Stevens.  
by Ellis Spear,  
Attorney.

(No Model.) 2 Sheets—Sheet 2.

W. J. STEVENS.
Horse Power.

No. 230,587. Patented July 27, 1880.

Attest:
R. F. Barnes,
S. W. Suley

Inventor:
William J. Stevens
by Ellis Spear,
Attorney.

N. PETERS, PHOTO-LITHOGRAPHER, WASHINGTON, D. C.

UNITED STATES PATENT OFFICE.

WILLIAM J. STEVENS, OF CANAJOHARIE, NEW YORK.

HORSE-POWER.

SPECIFICATION forming part of Letters Patent No. 230,587, dated July 27, 1880.

Application filed June 7, 1880. (No model.)

*To all whom it may concern:*

Be it known that I, WILLIAM J. STEVENS, of Canajoharie, in the county of Montgomery and State of New York, have invented a new and useful Improvement in Horse-Powers; and I do hereby declare that the following is a full, clear, and exact description of the same.

My invention relates to horse-powers of that class in which an endless platform moved by the weight of the animal is supported upon chains of wheels which move independently of the said platform.

My invention consists of certain details of construction, hereinafter specifically claimed, the object of which is to simplify the structure, to cause it to work with less friction, and to render it more durable.

Figure 1:
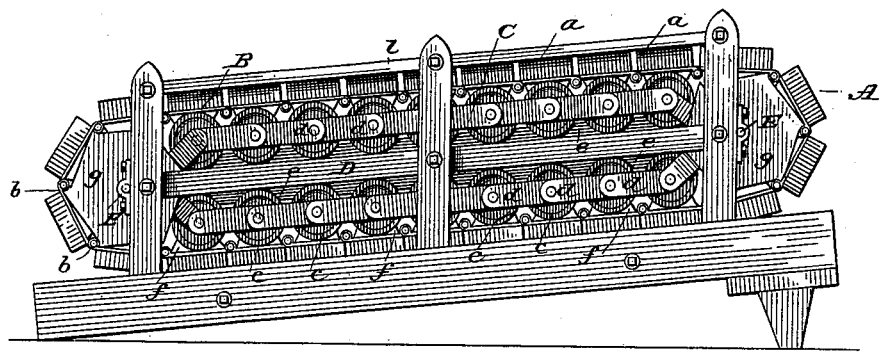
Figure 2:
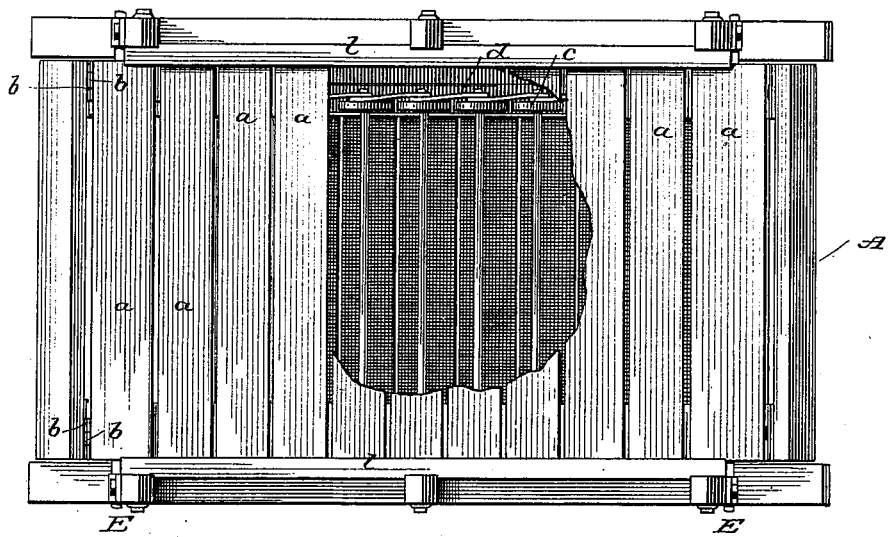
Figure 3:
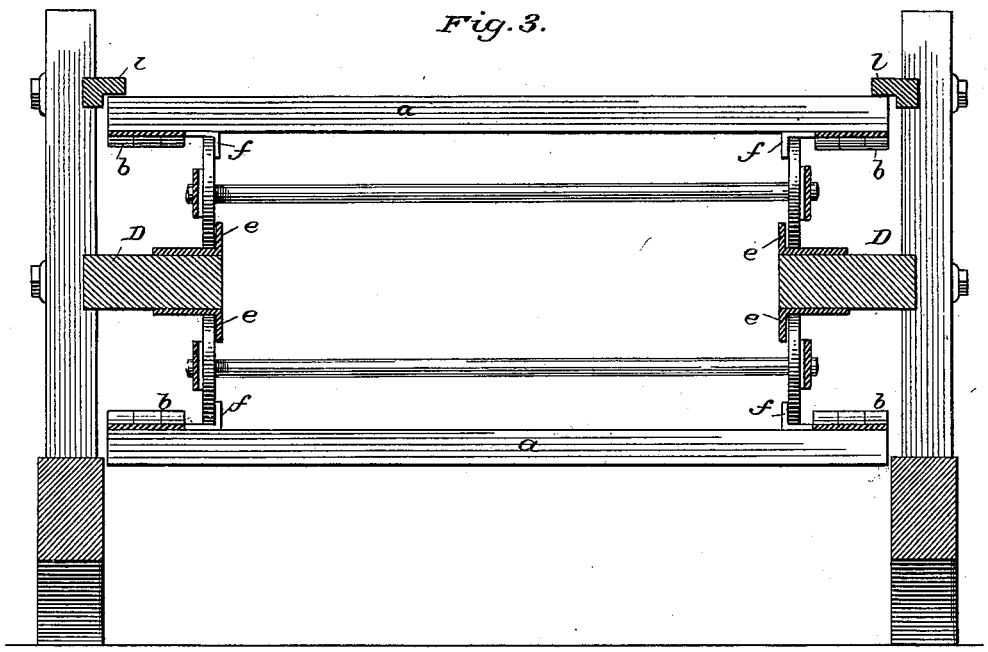
Figure 4:
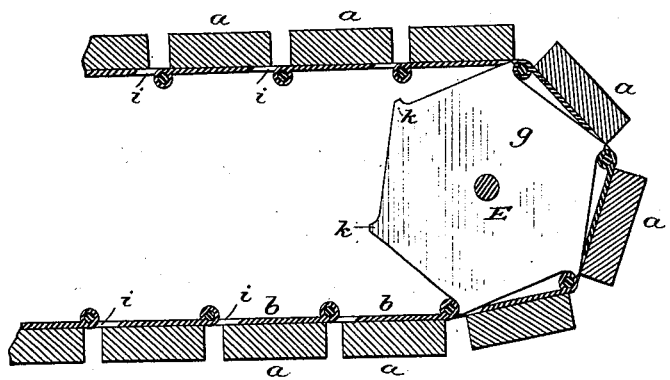

In the drawings, Figure 1 represents a side elevation of the apparatus; Fig. 2, a plan view, with some of the bridges of the traveling platform removed in order to disclose the interior. Fig. 3 is a central transverse section of the machine; and Fig. 4, a longitudinal section through a part of the flexible strap which carries one side of the platform, showing also one of the wheels driven by the platform.

In these figures, A represents the endless platform, composed of bridges $a\, a$. The ends of these bridges are supported by a flexible strap, B, composed of links $b\, b$, on each one of which the end of the bridge $a$ rests, being permanently fixed thereto.

The traveling platform is supported upon an endless chain of rollers or wheels, C, said chain being composed of wheels $c$ and links $d$ of ordinary construction. This endless chain of wheels is supported upon a fixed track, D, fastened to the side of the frame.

The track is provided with a flange, $e$, both above and below, which serves as a guide to the wheels.

The links of the endless flexible strap are provided also with flanges $f$, corresponding in shape and position, so that they travel directly over the flange $e$, and serve as guides against the upper part of the wheels above the track and the lower part of the wheels below the track.

The flanges $f$, of course, are upon the inner edges of the links, which are extended inward a slight distance beyond the hinges, so as to leave an unobstructed way for the wheels of the endless chain, which, by means of the flanges on the track and those on the links, are at all times guided securely.

At each end of the apparatus is a transverse shaft, E, journaled in the frame, and of ordinary construction. On these shafts are spurred wheels $g\, g$, made preferably polygonal.

The wheels are arranged on the shafts outside of the line of the chain-wheels and slightly overlapping this endless chain as it moves in its path. The supporting-strap on each side passes directly over these spurred wheels, and at the ends is carried by said wheels. Each link of the supporting-strap is formed with a hole, $i$, just in rear of the joint.

On the wheels $g$ are spurs $k$, exactly adapted in position and shape to take successively into the holes in the links as the supporting-strap passes along in its movement. By this device the wheels are rotated without danger of slipping and by very simple mechanism.

Pinions may be applied to either or both of the shafts for communicating power to the machinery to be driven.

The endless traveling platform is guided on each side by a flanged rail, $l\, l$, fixed to the side of the frame.

Having thus described my invention, what I claim, and desire to secure by Letters Patent, is—

1. In a horse-power, the combination of the endless wheel-chain, the flanged track D, and the flanged links of the endless supporting-strap, substantially as set forth.

2. The combination of the endless wheel-chain, the flanged track, the flanged links of the supporting-straps, the guide-rails $l\, l$, and the traveling platform, substantially as described.

3. The combination of the transverse shafts, the spurred wheels, the links of the supporting-strap provided with holes, and the traveling platform, substantially as described.

In testimony whereof I have signed my name to this specification in the presence of two subscribing witnesses.

WILLIAM J. STEVENS.

Witnesses:
N. S. BRUMLEY,
A. G. RICHMOND.